Figure 1:
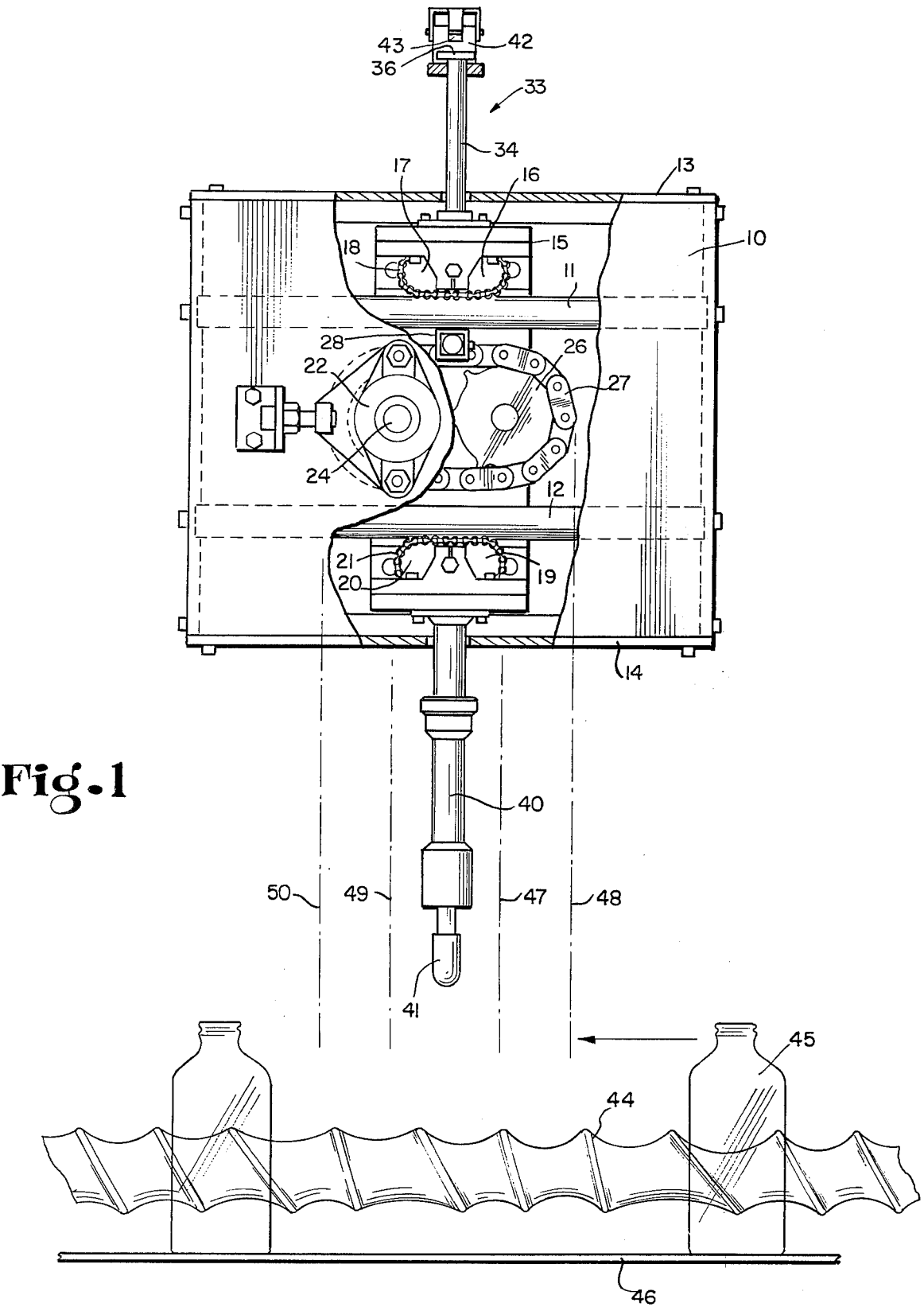

United States Patent [19]
Zappia

[11] B 3,921,303
[45] Nov. 25, 1975

[54] PLUG GAUGE

[75] Inventor: Anthony T. Zappia, Indianapolis, Ind.

[73] Assignee: Ball Brothers Service Corporation, Muncie, Ind.

[22] Filed: July 2, 1973

[21] Appl. No.: 375,652

[44] Published under the Trial Voluntary Protest Program on January 28, 1975 as document no. B 375,652.

[52] U.S. Cl. ................ 33/178 R; 33/174 R; 209/82
[51] Int. Cl.² ...................... G01B 3/46; G01B 5/00
[58] Field of Search .......... 33/174 R, 178 R, 178 E; 209/82, 90, 80

[56] References Cited
UNITED STATES PATENTS

| | | | |
|---|---|---|---|
| 2,596,342 | 5/1952 | McNutt et al. | 33/178 R |
| 2,987,179 | 6/1961 | Allgeyer et al. | 209/82 |
| 3,100,570 | 8/1963 | White | 33/178 R |
| 3,387,704 | 6/1968 | Powers | 209/82 |

*Primary Examiner*—William D. Martin, Jr.
*Assistant Examiner*—Richard R. Stearns
*Attorney, Agent, or Firm*—William R. Coffey

[57] ABSTRACT

A plug gauge for testing the dimensions of the mouths of pieces of glassware moving in single file past a testing station, an upper rod and a parallel lower rod, a carriage, an upper continuous strand trained about a pair of rotors on the carriage and bearing upon the upper surface of the upper rod, a lower continuous strand trained about another pair of rotors on the carriage and bearing upon the lower surface of the lower rod so that the carriage is supported upon the rods to travel lengthwise thereof, a plunger mounted on the carriage for reciprocation on an axis fixed relative to the carriage and comprising an outer sheath and an inner rod slidably received therein and projecting below the bottom of the sheath, a switch carried at the upper end of the sheath and having an actuator overlying the upper end of the rod, a spring resisting upward movement of the rod relative to the sheath, a third continuous strand trained about a pair of rotors mounted on fixed axes, and a pin fixed to a point on the third strand and operatively connected to the plunger sheath.

4 Claims, 2 Drawing Figures

PLUG GAUGE

The present invention relates to a plug gauge and more particularly to a machine for testing the dimensions of the upwardly-presented, open mouths of newly-made bottles as they flow in single file past a testing station. Broadly stated, it is the principal object of the present invention to provide a machine which will automatically discard from a flowing stream of bottles, any bottle whose open mouth is smaller than a predetermined standard. A further object of the invention is to provide a novel support for a reciprocating carriage upon which is mounted a plunger for reciprocation in a direction transverse to the direction of movement of the carriage, said plunger carrying, at its distal end, a plug gauge yieldably supported relative to the body of the plunger.

A further object of the invention is to provide novel means for congruently driving the reciprocatory carriage while concurrently driving the plunger, the carriage being driven through the plunger.

Still another object of the invention is to provide an endless chain, one link of which carries a device which is adjustably fixed to the outer member of such a plunger for accomplishing the compound movement of the carriage and of the plunger.

Still further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described, so long as the scope of the appended claims is not violated.

Figure 2:
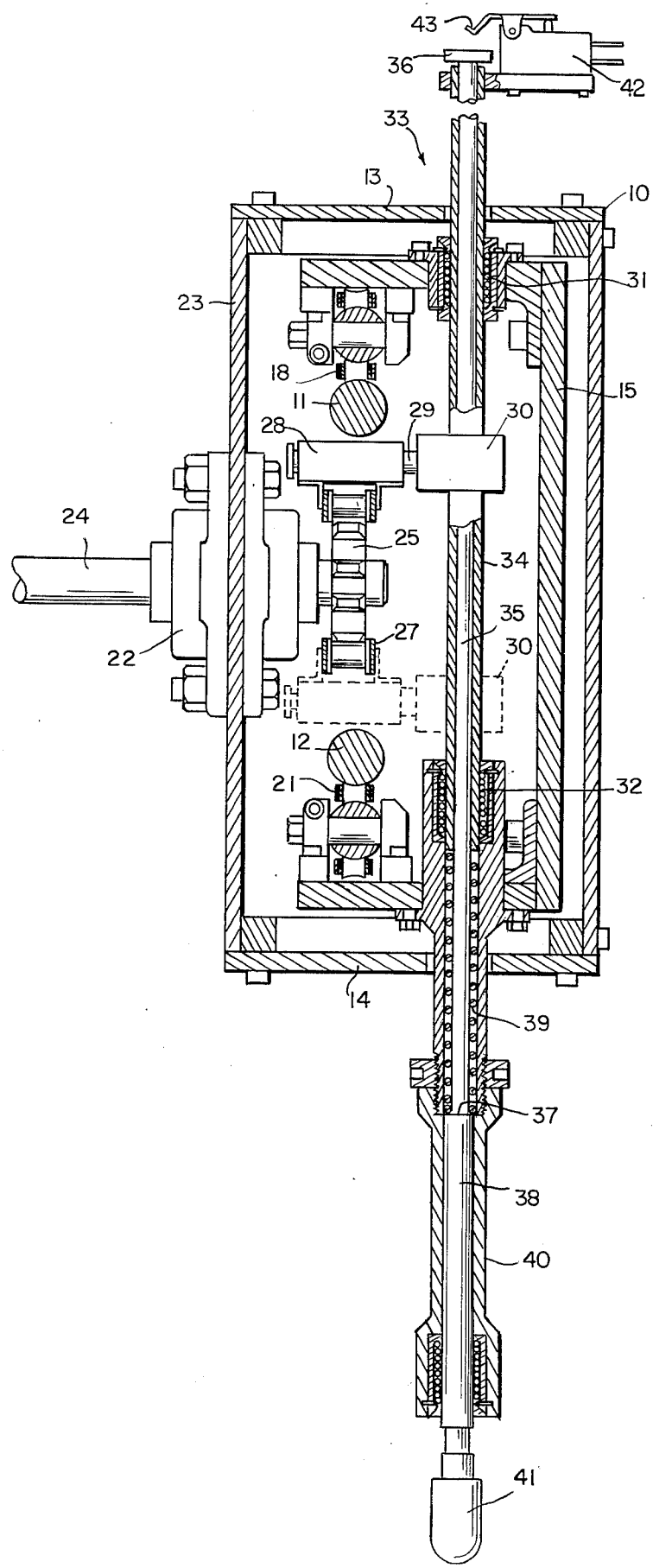

In the drawings:

FIG. 1 is a front elevation of an embodiment of my invention associated with a ware conveyor, parts being broken away for clarity of illustration; and FIG. 2 is a transverse section through the mechanism illustrated in FIG. 1.

Referring more particularly to the drawings, it will be seen that I have illustrated a housing 10 comprising top and bottom walls 13 and 14 as well as side and end walls. An upper guide rod 11 and a parallel lower guide rod 12 are suspended in spaced relation from the end walls of the housing 10. The top and bottom walls 13 and 14 of the housing 10 are provided with longitudinal slots for a purpose which will appear.

Within the housing 10 is a reciprocatory carriage 15. Sprockets or rotors 16 and 17 are mounted upon parallel axes near the upper end of the carriage; and an endless chain 18 is trained over said rotors. Similar rotors 19 and 20 are similarly mounted near the bottom of the carriage 15 and an endless chain 21 is trained over the sprockets 19 and 20. As is clearly shown in the drawings, one run of the chain 18 bears upon the upper surface of the rod 11 while one run of the chain 21 bears upon the lower surface of the rod 12 whereby the carriage 15 is supported from said rods for free longitudinal reciprocation relative thereto.

A bearing 22 supported upon, for instance, the front wall 23 of the housing 10 provides a fixed axis for a drive shaft 24. Within the housing 10, the drive shaft 24 supports a sprocket 25; and a similar bearing (not shown) supports a shaft for a sprocket 26 parallel to, but spaced from, the sprocket 25. The sprocket axes are parallel in the median plane which is parallel with the rods 11 and 12.

Fixed to one link of the chain 27 is a bearing block 28 in which is supported a pin 29 which carries a clamping collar 30. Coaxial bearings 31 and 32 are carried by the carriage 15 and reciprocably support a plunger indicated generally by the reference numeral 33. Said plunger comprises an outer sheath 34 and an inner rod 35 reciprocably slidable in the sheath 34. The collar 30 is adjustably clamped about the plunger sheath 34.

The upper or proximal end of the rod 35 carries an enlarged head 36 disposed beyond the proximal end of the sheath 34. Near its distal end, the rod 35 is enlarged as at 38 to define an upwardly facing shoulder 37 and a compression spring 39 is sleeved upon the rod 35 and confined between the distal end of the sheath 34 and the shoulder 37 to resist upward movement of the rod 35 relative to the sheath 34. A bearing extension 40 is preferably threadedly secured to the lower end of the bearing 32 to guide and protect the enlarged portion 38 of the plunger rod 35. One of a plurality of feelers or gauging noses 41 of various sizes is removably secured to the distal extremity of the rod 35 outside the extension 40.

A switch 42 may preferably be carried at the proximal end of the sheath 34 and is provided with an acutator 43 which overlies the head 36 of the rod 35 for a reason which will become apparent.

Suitable means is provided for carrying bottles 45 or other ware at a controlled rate past the apparatus thus far described. One such means is suggested in FIG. 1 and comprises a conveyor screw 44 overlying a platform 46 and constructed with a variable pitch thread. As shown, pieces of ware 45 will be introduced to the right-hand end of the screw 44 at which point the screw thread is so pitched as to produce ware movement substantially at the rate at which it has been moving upon the introducing conveyor (not shown). Almost immediately, the pitch is radically increased to move the piece at an accelerated rate and the pitch is thereupon quite promptly decreased to decelerate the ware piece.

It will be apparent that, from the point at which the bearing 28 begins to move downwardly as its carrying link begins to move around the sprocket 26, the movement of the collar 30 will become compound, having a horizontal component corresponding to the rate of movement of the carriage 15, and a vertical component corresponding to the downward movement of the bearing 28 as it begins to move around the sprocket 26. At about the point at which the construction line 48 is tangent to the chain 26, the nose 41 will encounter the open mouth of the ware piece 45. At this point, the horizontal component of movement of the bearing 28 is zero, and the pitch of the thread of the conveyor 44 must, therefore, be zero. As the chain 27 continues to move, however, the horizontal component of movement of the bearing 28 will gradually increase while its vertical component of movement decreases to become zero at the point at which the construction line 47 intersects the bearing 28. At this point, the pitch of the thread of the conveyor 44 must have increased so that the rate of movement of the ware piece 45 will be equal to the rate of movement of the chain 27 between the construction line 47 and the construction line 49, while the nose 41 is engaged in the mouth of an acceptable ware piece 45.

As the bearing 28 begins to move about the sprocket 25, its horizontal component of movement will begin to decrease and its vertical component of movement will begin to increase. the pitch of the thread of the screw 44, therefore, must begin to decrease as the ware piece begins to pass the construction line 49; and it must continue to decrease until the nose 41 has been disengaged from the ware piece mouth. Once that disengagement has occurred, and it will occur before the ware piece reaches the construction line 50, the pitch of the conveyor thread may be increased to move the newly tested piece rapidly away from the testing station.

Screw conveyors of the character here under consideration are available on the commercial market to meet any desired specifications and therefore the particular design of the screw conveyor herein illustrated constitutes no part of my present invention except insofar as I have recognized the necessity for synchronizing the movement of the ware with the rate of horizontal movement of the carriage 15.

It will now be apparent that, when the shaft 24 is driven, the bearing 28, moving toward the right from its position illustrated in FIG. 1, will carry with it, through the pin 29 and collar 30, the plunger 33. The plunger being mounted in the coaxial bearings 31 and 32 will carry with it the carriage 15.

Now, as the chain link carrying the bearing 28 begins to follow the contour of the sprocket 26, the bearing 28 will begin to assume an increasing downward component of movement while its horizontal component of movement continuously decreases until that link reaches the horizontal plane common to the axes of the sprockets 25 and 26. The downward component of the movement of the bearing 28 will carry with it the outer sheath 34 of the plunger 33; and so long as the rod 35 meets no resistance, said rod will move with the sheath. The parts are so proportioned and designed that, when the feeler 41 first enters the horizontal plane in which is disposed the uppermost end of a piece of ware, the horizontal component of movement of that feeler will be synchronized with the horizontal movement of the ware, and that synchronization will continue until, as the chain link carrying the bearing 28 begins to move around the sprocket 25, the feeler 41 is retracted beyond the plane in which the upper end of the ware is disposed.

If, as the plunger 33 moves downwardly, the nose 41 encounters the upper end of a piece of ware whose mouth is distorted or for any other reason is smaller than the nose 41, the rod 35 will thereby be arrested and the sheath 34 will continue to move downwardly, compressing the spring 39. As the sheath so moves relative to the rod 35, the switch 42 will be moved downwardly relative to that rod until its actuator 43 engages and is moved by the rod head 36.

The switch 42 may be connected in a circuit which will activate a shunting means (not shown) of such character as to discard the ware piece which arrested the downward movement of the rod 35. Many such shunting devices are known commercially and the shunting device used with the presently disclosed mechanism forms no part of my invention and is therefore not illustrated or described in detail.

Obviously, as the sheath 34 is retracted after the nose 41 has encountered a defective ware piece, said nose will remain in contact with the ware piece as the sheath 34 is withdrawn, while the spring 39 expands. As the sheath so rises, the switch 42 will be carried upwardly relative to the rod head 36 until the switch is returned to its illustrated condition; and the proximal end of the sheath 34 will engage the rod head 36 to lift the nose 41 away from the defective piece.

I claim as my invention:

1. A plug gauge for testing ware comprising linear guide means, a carriage mounted to reciprocate on said guide means, a plunger supported on said carriage for reciprocation transversely of the travel path of said carriage, an endless strand mounted adjacent said carriage to travel in a closed path lying in a plane parallel to the path of reciprocation of said plunger and said travel path of said carriage, means fixed to said strand means to travel about said closed path therewith and having an operative connection with said plunger for simultaneously reciprocably driving said plunger and said carriage, means to drive said strand, and means for conveying said ware along a path, a portion of which is parallel to said travel path and located directly below said plunger, said portion of said conveying means including means synchronizing the speed of travel of said ware along said portion to the speed of movement of said carriage.

2. The gauge of claim 1 in which said guide means comprises two straight, parallel, fixed rods, one above and the other below said strand, a first pair of rotors mounted on said carriage above said first-named strand and a second endless strand trained about said rotors and bearing on the upper surface of said one rod, and a second pair of rotors mounted on said carriage below said first-named strand and a third endless strand trained about said second pair of rotors and bearing on the lower surface of said other rod.

3. The gauge of claim 1 in which said plunger comprises an outer sheath mounted for reciprocation upon an axis fixed relative to said carriage, and an inner rod slidably supported in said sheath, spring means disposed between said sheath and said rod for biasing the distal end of said rod toward a lower position and a gauging nose at the distal end of said rod.

4. The combination of claim 3 including switch means carried near the proximal end of said sheath and having an actuator overlying the proximal end of said rod whereby, when said nose encounters an obstacle to arrest movement of said rod in one direction while movement of said sheath in that direction continues, said actuator will encounter the proximal end of said rod to actuate said switch.

* * * * *